Sept. 26, 1967 L. J. KIRKHAM 3,343,528
ELECTROCARDIOGRAPHIC SWITCHING SYSTEM
Filed Oct. 9, 1964
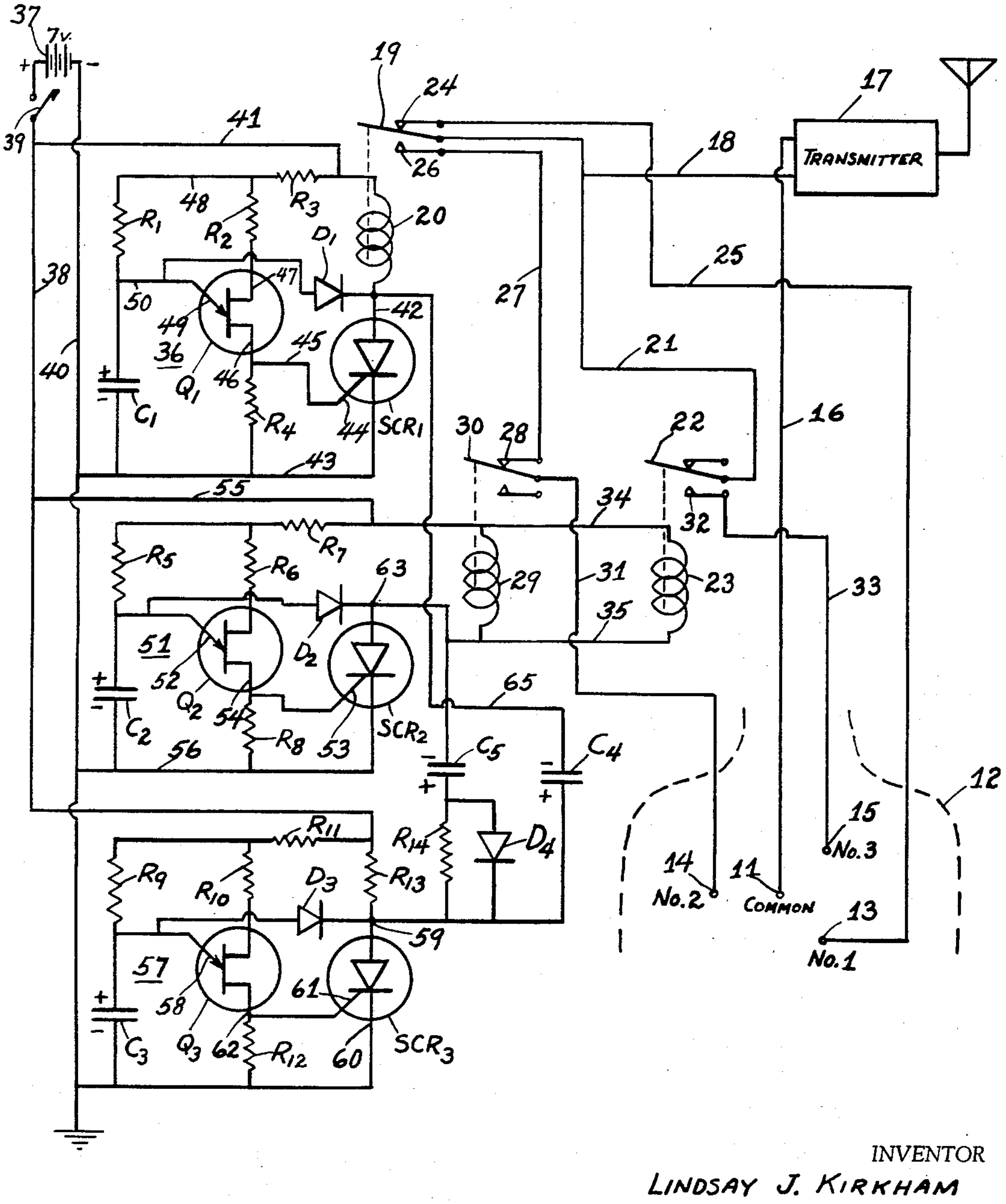
INVENTOR
LINDSAY J. KIRKHAM
BY Herman L. Gordon
ATTORNEY

United States Patent Office 3,343,528

Patented Sept. 26, 1967

3,343,528

ELECTROCARDIOGRAPHIC SWITCHING SYSTEM

Lindsay J. Kirkham, 222 6th St. NW., Mason City, Iowa 50401

Filed Oct. 9, 1964, Ser. No. 402,762

17 Claims. (Cl. 128—2.06)

ABSTRACT OF THE DISCLOSURE

An electronic switching circuit to sequentially operate relays connecting body electrodes to a transmitter. Unijunction transistor time delay circuits are employed which in turn fire silicon-controlled rectifiers in series with the relays. Two of the SCR delay circuits are used to control the lead switching and a third SCR delay circuit is used to turn off the first two circuits. The third SCR delay circuit is used to allow the timing sequence to repeat itself. The respective Unijunction transistor time delay circuits are triggered by R-C charging circuits having successively slower charging rates.

This invention relates to electrocardiographs, and more particularly to an automatic electronic sequence switching electrocardiograph system for sequentially switching a plurality of electrocardiograph leads at pre-set time intervals.

A main object of the invention is to provide a novel and improved apparatus for sequentially connecting electrocardiograph leads to a radio transmitter or other type of transmitter for the purpose of transmitting the signals sequentially through a common transmission channel, the apparatus being light in weight, being highly portable, and being characterized by low power consumption, enabling it to be adequately energized from a relatively small battery.

A further object of the invention is to provide an improved electronic sequence switching system especially suitable for electrocardiographic telemetry, said system providing a means for automatically and sequentially connecting a plurality of electrocardiographic leads to a transmitter at pre-set time intervals so that voltage variations between several points on a body surface may be sequentially transmitted, whereby different aspects of the voltage changes incident to cardiac contraction may be observed, using a single transmission channel.

Further objects and advantages of the invention will become apparent from the following description and claims, and from the accompanying drawing, wherein the single figure is a schematic wiring diagram showing a typical electrocardiographic switching apparatus constructed in accordance with the present invention.

In radio telemetry of biological information heretofore it has been usually possible to transmit only one voltage variation between two poles by means of a radio transmitter. In electrocardiographic telemetry it is frequently advisable and useful to transmit the voltage variations between several points on the body surface. This permits observation of different "views" of the voltage changes incident to cardiac contraction or other cardiac action. The system of the present invention is arranged to provide reception, in sequence, of information from a plurality of electrode positions. In the specific embodiment herein described, sequential voltage information from three different electrode positions is provided, although the system can be easily expanded to include more electrode positions if not limited by considerations of weight and cost.

The electronic switching circuit of the present invention employs Unijunction time delay circuits which in turn fire silicon-controlled rectifiers. In series with the rectifiers are relays which do the actual switching of the electrocardiograph leads. In the typical circuit herein described two of the time delay circuits are used to control the lead switching and a third Unijunction silicon-controlled rectifier circuit is used to turn off the first two silicon-controlled rectifier circuits. This third silicon-controlled rectifier circuit is necessary in order for the timing sequence to start over from the beginning after the signal from the third EKG lead has been transmitted.

Referring to the drawing, 11 designates a common electrode connected to the surface of the body 12, and 13, 14 and 15 designate additional electrodes connected to spaced points on the body surface.

The common electrode 11 is connected by a wire 16 to one input terminal of a radio transmitter 17. The other input terminal of the transmitter 17 is connected by a wire 18 to the movable pole 19 of a relay 20. Wire 18 is also connected by a wire 21 to the movable pole 22 of a relay 23.

Pole 19 normally engages a first stationary contact 24 of relay 20, said first stationary contact 24 being connected by a wire 25 to the electrode 13. When relay 20 is energized, pole 19 disengages from contact 24 and engages a second stationary contact 26 of relay 20, said contact 26 being connected by a wire 27 to a first stationary contact 28 of another relay 29. Relay 29 has a movable pole 30 which normally engages contact 28, said pole 30 being connected by a wire 31 to electrode 14.

When relay 23 is energized its pole 22 moves into engagement with a stationary contact 32, said contact 32 being connected by a wire 33 to electrode 15. The windings of relays 29 and 23 are connected in parallel to wires 34 and 35.

Designated at $Q_1$ is a first Unijunction transistor connected in a first time delay circuit 36 which controls the energization of the relay 20. A source of current, comprising a battery 37, has its positive terminal connected to a wire 38 through a main control switch 39. The negative terminal of battery 37 is connected to a grounded wire 40. One terminal of the winding of relay 20 is connected by a wire 41 to positive battery wire 38. The other terminal of said winding is connected through a wire 42, a silicon-controlled rectifier $SCR_1$ and a wire 43 to negative battery wire 40. Rectifier $SCR_1$ is non-conducting until its control electrode 44 acquires a predetermined positive potential. Control electrode 44 is connected by a wire 45 to one base terminal 46 of the Unijunction transistor $Q_1$. Said base terminal 46 is connected to wire 43 through a resistor $R_4$. The other base terminal 47 of the transistor $Q_1$ is connected through a resistor $R_2$ to a wire 48, which is connected in turn through a resistor $R_3$ to wire 41. Connected in series across wires 48 and 43 are a resistor $R_1$ and a capacitor $C_1$. The emitter electrode 49 of transistor $Q_1$ is connected by a wire 50 to the junction of resistor $R_1$ and capacitor $C_1$. A diode $D_1$ is connected between wires 50 and 42.

The resistors $R_2$, $R_3$ and $R_4$ are selected so that when transistor $Q_1$ conducts, electrode 44 acquires sufficient potential to fire rectifier $SCR_1$. However, this will not occur until the potential on emitter 49 rises to a predetermined value, in accordance with the charging rate of capacitor $C_1$. Thus, resistor $R_1$ and capacitor $C_1$ are selected so as to provide a desired time delay in turning on Unijunction transistor $Q_1$, for example, 7 seconds.

As will be subsequently explained, the diode $D_1$ is employed in order to obtain accurate timing.

Normally, electrode 13 is connected to transmitter input wire 18 through wire 25, contact 24 and pole 19. When rectifier $SCR_1$ fires responsive to the turning on of transistor $Q_1$ after the above-mentioned time delay, relay 20 becomes energized and pole 19 disengages from contact 24 and engages contact 26. This disconnects electrode 13 from transmitter input wire 18 and connects electrode 14 to said input wire through wire 31, pole 30, contact 28, wire 27, contact 26, and pole 19.

The second time delay circuit, designated at 51 is similar to the first time delay circuit and includes a Unijunction transistor $Q_2$, a silicon-controlled rectifier $SCR_2$, resistors $R_7$, $R_6$ and $R_8$, corresponding to the resistors $R_3$, $R_2$ and $R_4$ of the first time delay circuit, and RC timing circuit $R_5$–$C_2$, and a diode $D_2$ connected between the emitter 52 of transistor $Q_2$ and wire 35, as shown. The control electrode 53 of the rectifier $SCR_2$ is connected to the base electrode 54 of transistor $Q_2$ so as to fire rectifier $SCR_2$ when transistor $Q_2$ is turned on. The resistor $R_5$ and capacitor $C_2$ are selected so as to provide a predetermined time delay, for example, 14 seconds, before transistor $Q_2$ is turned on.

As shown, wire 34 is connected by a wire 55 to the positive battery wire 38. The silicon-controlled rectifier $SCR_2$ is connected between wire 35 and the grounded wire 56. Therefore, when the rectifier $SCR_2$ is fired, responsive to the conduction of transistor $Q_2$, the relays 29 and 23 simultaneously become energized. This disconnects electrode 14 from transmitter input wire 18 by the disengagement of pole 30 from contact 28 and connects electrode 15 to wire 18 through wire 33, contact 32, pole 22 and wire 21.

The diode $D_2$ is employed for the same purpose as diode $D_1$, namely, to obtain accurate timing.

A third timing circuit, designated at 57, similar to the previously described timing circuits 36 and 51, is connected in a manner such as to turn off the silicon controlled rectifiers $SCR_1$ and $SCR_2$ after a predetermined time period, for example, 20 seconds, thereby returning the system to its starting condition. Thus, circuit 57 comprises Unijunction transistor $Q_3$, silicon-controlled rectifier $SCR_3$, the respective base terminal resistors $R_{10}$ and $R_{12}$, the supply current resistor $R_{11}$, and the RC timing branch including resistor $R_9$ and capacitor $C_3$ connected in series between wire 40 and the junction of resistors $R_{10}$ and $R_{11}$. The emitter of transistor $Q_3$, shown at 58, is connected to the junction of elements $R_9$ and $C_3$, and a diode $D_3$ is connected between emitter 58 and one terminal 59 of silicon-controlled rectifier $SCR_3$, the opposite terminal 60 thereof being connected to the grounded wire 40. The control electrode 61 of rectifier $SCR_3$ is connected to the base terminal 62 of transistor $Q_3$. A resistor $R_{13}$ is connnected between positive battery wire 38 and rectifier terminal 59.

A capacitor $C_4$ is connected between terminal 42 of rectifier $SCR_1$ and terminal 59 of rectifier $SCR_3$.

A capacitor $C_5$ is connected through a resistor $R_{14}$ between terminal 63 (wire 35) of rectifier $SCR_2$ and terminal 59 of rectifier $SCR_3$. A diode $D_4$ is connected across resistor $R_{14}$.

As above explained, the components $R_1$ and $C_1$ are selected to turn on the Unijunction transistor $Q_1$ in 7 seconds and the components $R_5$ and $C_2$ are selected to turn on the Unijunction transistor $Q_2$ in 14 seconds. Components $R_9$, $C_3$, $C_4$ and $C_5$ are selected to turn on Unijunction transistor $Q_3$ in 20 seconds. At the end of the first 7 seconds, when rectifier $SCR_1$ is fired, the negative plate of capacitor $C_4$ is immediately connected to ground (through connection wire 65 and rectifier $SCR_1$), and the positive plate thereof receives its charge through resistor $R_{13}$ and from capacitor $C_3$. Capacitor $C_4$ remains charged until the end of the second 7 seconds (or a total of 14 seconds from the beginning) at which time $SCR_2$ fires. When this occurs, the negative plate of capacitor $C_5$ (wire 35) is immediately connected to ground and the positive plate thereof receives its charge from the positive plate of capacitor $C_3$ and the positive plate of capacitor $C_4$, as well as from the positive battery wire 38 through resistor $R_{13}$. Were resistor $R_{14}$ not present, capacitor $C_5$ would so subtract positive charge from capacitor $C_4$ as to cause an effective short across rectifier $SCR_1$ and turn it off prematurely. By employing the resistor $R_{14}$ between capacitors $C_5$ and $C_4$, the charge is allowed to equalize between capacitor $C_4$, the positive battery wire 38 and the capacitor $C_3$ at a relatively slow rate which thus prevents premature turning off of rectifier $SCR_1$. At the end of the 20 seconds (from the beginning) the voltage across capacitor $C_3$ reaches the value required to turn on transistor $Q_3$ and fire rectifier $SCR_3$. This immediately connects the positive plates of capacitors $C_5$ and $C_4$ to the negative battery wire 40, which creates an effective short across rectifiers $SCR_1$ and $SCR_2$, simultaneously turning them off.

Diode $D_4$ is employed to by-pass resistor $R_{14}$, which would otherwise prevent sufficient shorting action across rectifier $SCR_2$ to turn it off.

Capacitor $C_3$ need only be relatively small in size because as capacitor $C_4$ and $C_5$ receive their charges they subtract some from the positive plate of capacitor $C_3$, thus delaying its charging time appreciably. This is a factor of importance from the standpoint of size and weight.

As above mentioned, the diodes $D_1$ and $D_2$ are employed in order to obtain accurate timing. Since each Unijunction transistor time delay circuit is essentially a multivibrator which produces a sawtooth wave form at its output base terminal (46 or 54) it would continue to oscillate regardless of whether its associated silicon-controlled rectifier was conducting or non-conducting. As a result, without the diodes, when the third timing circuit 57 is utilized to turn off rectifier $SCR_1$, for instance, the time interval between this turn-off time and the time rectifier $SCR_1$ is turned back on again would depend on chance with regard to what point on the sawtooth wave form the turn-off time occurs. This would give a quite variable time delay, which would be intolerable for the intended purpose of the switching system. By employing diode $D_1$ to connect the positive plate of the capacitor $C_1$ to ground when rectifier $SCR_1$ fires, continued oscillation of the transistor circuit is prevented. When the rectifier is turned off, the timing period starts each time from zero or near zero voltage, thus insuring accurate timing of the interval before the rectifier is again fired. Furthermore, diodes $D_1$ and $D_2$, because of the fact that they bring the timing capacitors $C_1$ and $C_2$ down to near zero voltage each time prior to each charge, allow timing capacitors to be used which are much smaller than would be the case in the absence of said diodes. This is a consideration of importance with regard to weight and cost of the apparatus.

By employing the capacitors $C_4$ and $C_5$, resistor $R_{14}$ and the diodes $D_3$ and $D_4$ in the manner above described, the timing circuit 57, employing the single silicon-controlled rectifier $SCR_3$, can be used to turn off a plurality of preceding rectifiers simultaneously, for example, the rectifiers $SCR_1$ and $SCR_2$, instead of requiring a separate turn-off circuit for each timing stage.

While a specific embodiment of an improved electrocardiographic switching system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, means to sequentially render the electronic switches conducting responsive to the reception of respective predetermined charges by the capacitors, means to successively connect the electrodes to said input terminal responsive to the conduction of the respective electronic switches, means to discharge each capacitor responsive to the conduction of its associated electronic switch, and means to restore all the electronic switches to non-conducting conditions responsive to the conduction of the electronic switch associated with the timing circuit having the slowest charging rate.

2. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, a normally non-conducting triggering transistor connected to each electronic switch, means to render each of the electronic switches conductive responsive to the conduction of its associated transistor, means to sequentially render the transistors conducting responsive to the reception of respective predetermined charges by the capacitors, means to successively connect the electrodes to said input terminal responsive to the conduction of the respective electronic switches, and means to cut off each transistor responsive to the conduction of its associated electronic switch.

3. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, a normally non-conducting triggering transistor connected to each electronic switch, means to render each of the electronic switches conductive responsive to the conduction of its associated transistor, means to sequentially render the transistors conducting responsive to the reception of respective predetermined charges by the capacitors, means to successively connect the electrodes to said input terminal responsive to the conduction of the respective electronic switches, means to cut off each transistor responsive to the conduction of is associated electronic switch, and means to restore all the electronic switches to non-conducting conditions responsive to the conduction of the electronic switch associated with the timing circuit having the slowest charging rate.

4. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, a normally non-conducting triggering transistor connected to each electronic switch, each transistor having an emitter rendering the transistor conductive responsive to a predetermined potential on the emitter, the emitters being connected to the respective capacitors to receive the charging potentials on the capacitors, means to render each of the electronic switches conductive responsive to the conduction of its associated transistor, whereby the electronic switches are sequentially rendered conducting responsive to the charging of the capacitors, means to successively connect the electrodes to said input terminal responsive to the conduction of the respective electronic switches, means to discharge each capacitor responsive to the conduction of its associated electronic switch, whereby to cut off its associated transistor, and means to restore all the electronic switches to non-conducting conditions responsive to the conduction of the electronic switch associated with the timing circuit having the slowest charging rate.

5. The structure of claim 1, and wherein the electronic switches comprise silicon-controlled rectifiers.

6. The structure of claim 5, and wherein the last-named means comprises respective short-circuiting branches connected across the preceding silicon-controlled rectifiers through the silicon-controlled rectifier associated with the timing circuit having the slowest charging rate.

7. The structure of claim 1, and wherein the means to discharge the capacitors comprises respective diodes connected across the capacitors through the associated electronic switches.

8. The structure of claim 2, and wherein the means to cut off the transistors comprises respective diodes connected across the capacitors through the associated electronic switches.

9. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, circuit means connecting one of the electrodes to said input terminal when all the electronic switches are non-conducting, means to sequentially render the electronic switches conducting responsive to the accumulation of respective predetermined charges by the capacitors, means to successively connect the other electrodes to said input terminal responsive to the conduction of the respective electronic switches, and means to restore all the electronic switches to their normal non-conducting conditions responsive to the conduction of the electronic switch associated with the timing circuit having the slowest charging rate.

10. In an electrocardiographic transmission system, transmission means having an input terminal, a plurality of electrodes adapted to be mounted on spaced portions of a living body, a plurality of R-C timing circuits, each having a chargeable capacitor and having successively slower charging rates, a source of charging potential connected to said timing circuits, a normally non-conducting electronic switch associated with each timing circuit, circuit means connecting one of the electrodes to said input terminal when all the electronic switches are non-conducting, respective triggering transistors operatively connected to said electronic switches, means to sequentially activate the triggering transistors responsive to the accumulation of respective predetermined charges by the capacitors, whereby to sequentially render the electronic switches conductive, means to successively connect the other electrodes to said input terminal responsive to the conduction of the respective electronic switches, means to deactivate each triggering transistor responsive to the conduction of its associated electronic switch, and means to restore all the electronic switches to their normal non-conducting conditions responsive to the conduction of the electronic switch associated with the timing circuit having the slowest charging rate.

11. The structure of claim 10, and wherein the means to deactivate each transistor comprises a diode connected across the capacitor of the associated timing circuit through the associated electronic switch.

12. The structure of claim 10, and wherein the last-named means comprises respective shorting branch circuits connected across the previous electronic switches through the electronic switch associated with the timing circuit having the slowest charging rate.

13. The structure of claim 12, and wherein each shorting circuit includes a capacitor, and wherein the means to deactivate each transistor comprises a respective diode connected across the capacitor of the associated timing circuit through the associated electronic switch.

14. The structure of claim 13, and wherein the electronic switches comprise silicon-controlled rectifiers.

15. In an electrocardiographic transmission system, transmission means having an input terminal, a plurality of electrodes adapted to be monuted on spaced portions of a living body, a plurality of R-C timing circuits, each having a chargeable capacitor and having successively slower charging rates, a source of charging potential connected to said timing circuits, and voltage-responsive switching means connecting the respective electrodes successively to said input terminal responsive to the successive reception of respective predetermined charges by the capacitors.

16. In an electrocardiographic transmission system, transmission means having an input terminal, a plurality of electrodes adapted to be mounted on spaced portions of a living body, a plurality of normally non-conducting electronic switches, means to sequentially render the electronic switches conducting, circuit means including said electronic switches connecting the electrodes to said input terminal, whereby the electrodes are sequentially connected to said input terminal responsive to the sequential conduction of the respective electronic switches, and means to restore all the electronic switches to their normal non-conducting conditions responsive to the conduction of the last electronic switch.

17. In an electrocardiographic transmission system, transmission means having an input terminal, a plurality of electrodes adapted to be mounted on spaced portions of a living body, a plurality of electronic switches, each having a non-conducting normal state, circuit means connecting one of the electrodes to said input terminal responsive to all the electronic switches being in said non-conducting normal state, electrically actuated means rendering the electronic switches sequentially conducting, circuit means to successively connect the other electrodes to said input terminal responsive to the sequential conduction of the respective electronic switches, and means to restore all the electronic switches to said normal non-conducting state responsive to the conduction of the last electronic switch.

References Cited

UNITED STATES PATENTS

| | | | |
|---|---|---|---|
| 2,684,278 | 7/1954 | Marchand | 128—2.06 X |
| 2,865,366 | 12/1958 | Partridge | 128—2.06 |
| 3,195,535 | 7/1965 | Westermann | 128—2.06 |

RICHARD A. GAUDET, *Primary Examiner.*

SIMON BRODER, *Examiner.*